(12) United States Patent
Huang et al.

(10) Patent No.: US 8,873,844 B2
(45) Date of Patent: Oct. 28, 2014

(54) LARGE-SCALE STRONGLY SUPERVISED ENSEMBLE METRIC LEARNING

(71) Applicant: NEC Laboratories America, Inc., Princeton, NJ (US)

(72) Inventors: Chang Huang, San Jose, CA (US); Shenghuo Zhu, Santa Clara, CA (US); Kai Yu, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 106 days.

(21) Appl. No.: 13/682,780

(22) Filed: Nov. 21, 2012

(65) Prior Publication Data

US 2013/0129202 A1 May 23, 2013

Related U.S. Application Data

(60) Provisional application No. 61/562,102, filed on Nov. 21, 2011.

(51) Int. Cl.
*G06K 9/62* (2006.01)

(52) U.S. Cl.
CPC ............ *G06K 9/6256* (2013.01); *G06K 9/6232* (2013.01)

USPC .............. 382/160; 382/157; 702/12; 702/20; 702/48

(58) Field of Classification Search
USPC .................. 382/157, 160; 706/12, 20, 48
See application file for complete search history.

(56) References Cited

U.S. PATENT DOCUMENTS

| 7,996,343 | B2 * | 8/2011 | Zhao et al. ..................... 706/12 |
| 8,488,873 | B2 * | 7/2013 | Rousson et al. ............... 382/159 |
| 8,565,537 | B2 * | 10/2013 | Bouguet et al. ............... 382/224 |
| 2013/0129202 | A1 * | 5/2013 | Huang et al. .................. 382/160 |

* cited by examiner

*Primary Examiner* — Gregory M Desire
(74) *Attorney, Agent, or Firm* — Joseph Kolodka

(57) ABSTRACT

Systems and methods for metric learning include iteratively determining feature groups of images based on its derivative norm. Corresponding metrics of the feature groups are learned by gradient descent based on an expected loss. The corresponding metrics are combined to provide an intermediate metric matrix as a sparse representation of the images. A loss function of all metric parameters corresponding to features of the intermediate metric matrix are optimized, using a processor, to learn a final metric matrix. Eigenvalues of the final metric matrix are projected onto a simplex.

10 Claims, 2 Drawing Sheets

US 8,873,844 B2

LARGE-SCALE STRONGLY SUPERVISED ENSEMBLE METRIC LEARNING

RELATED APPLICATION INFORMATION

This application claims priority to provisional application Ser. No. 61/562,102 filed on Nov. 21, 2011, incorporated herein by reference in its entirety.

BACKGROUND

1. Technical Field

The present invention relates to metric learning and more specifically to large-scale strongly supervised ensemble metric learning.

2. Description of the Related Art

The goal of metric learning is to find appropriate similarity measurements between pairs of instances that preserve a desired distance structure. Recently, many supervised metric learning methods have been proposed to learn Mahanalobis distance metrics for clustering or k-nearest neighbor classification. Supervised metric learning can be divided into two categories based upon supervision type. Weakly supervised metric learning learns metrics from directly provided pairwise constraints between instances. Such weak constrains are also known as side information. Strongly supervised metric learning receives explicit class labels assigned to every instance from which a large number of constraints can be generated. While conventional metric learning methods perform well in data sets with a smaller number of features, they are very limited in tasks with high dimensional data. This is particularly true when using overcomplete representations of data, where high amounts of redundancy need to be carefully addressed.

SUMMARY

A method for metric learning includes iteratively determining feature groups of images based on its derivative norm. Corresponding metrics of the feature groups are learned by gradient descent based on an expected loss. The corresponding metrics are combined to provide an intermediate metric matrix as a sparse representation of the images. A loss function of all metric parameters corresponding to features of the intermediate metric matrix are optimized, using a processor, to learn a final metric matrix. Eigenvalues of the final metric matrix are projected onto a simplex.

A system for metric learning includes a sparse block diagonal metric ensembling module configured to iteratively determine feature groups of images based on its derivative norm, learn corresponding metrics of the feature groups by gradient descent based on an expected loss, and combine the corresponding metrics to provide an intermediate metric matrix as a sparse representation of the images. A joint metric learning module is configured to optimize, using a processor, a loss function of all metric parameters corresponding to features of the intermediate metric matrix to learn a final metric matrix. Eigenvalues of the final metric matrix are projected onto a simplex.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
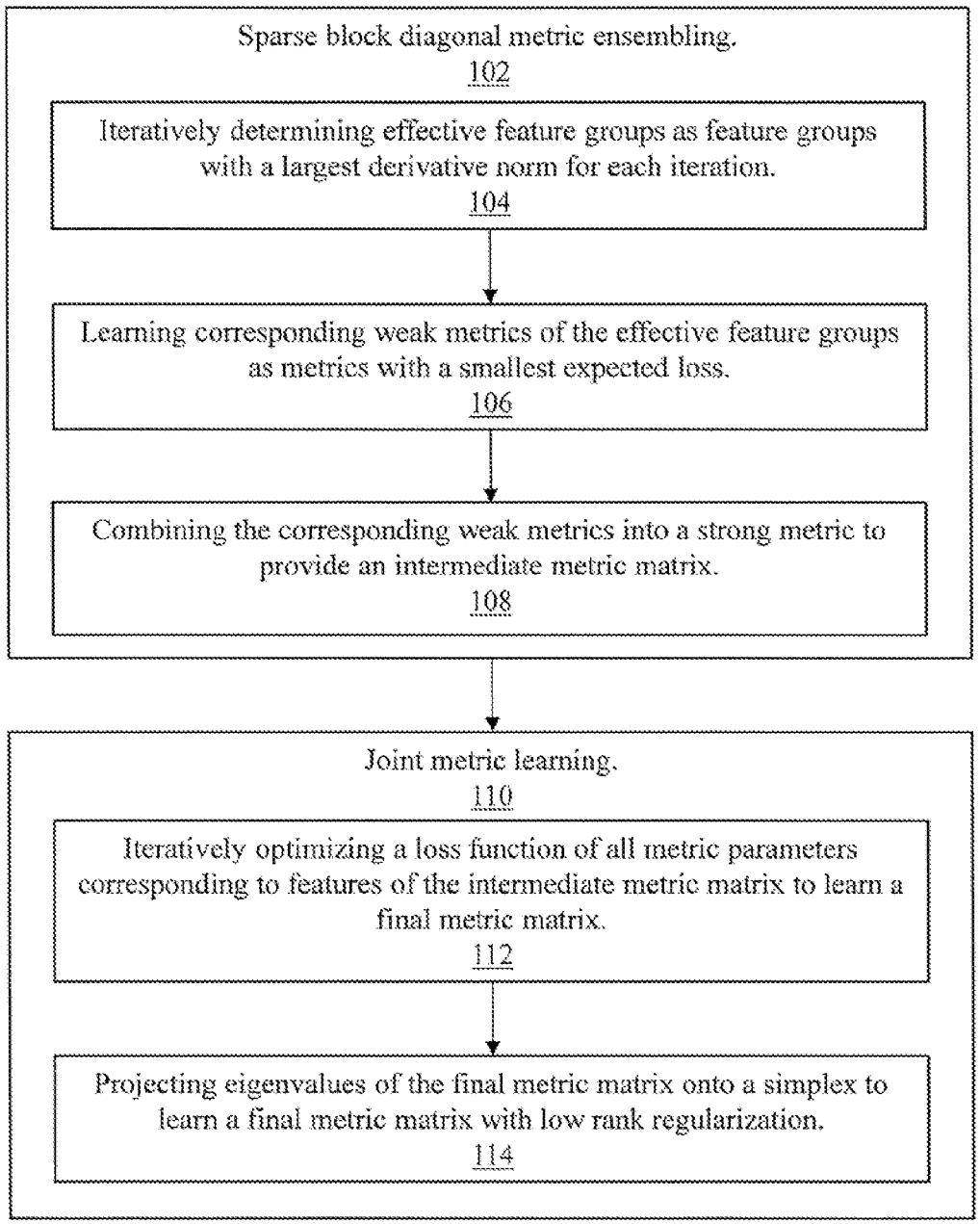
FIG. 1 is a block/flow diagram showing a method for metric learning in accordance with one embodiment.

In accordance with the present principles, systems and methods for large-scale strongly supervised ensemble metric learning are provided. Ensemble metric learning includes two consecutive steps: sparse block diagonal metric ensembling and joint metric learning. Sparse block diagonal metric ensembling selects effective features and learns their associated weak metrics that correspond to diagonal blocks of a Mahanalobis matrix in the entire feature space. Joint metric learning learns another Mahanalobis matrix in the feature subspace enabled by the sparse block diagonal metric ensembling step by jointly considering already selected features, with an optional low-rank constraint to pursue final representations of instances in an even lower space. Advantageously, large-scale strongly supervised ensemble metric learning is able to learn a sparse combination of features from an overcomplete feature set to achieve very low-dimensional representation of each instance to facilitate, e.g., image verification and retrieval tasks.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Initially, symbols and notations that will be used throughout this discussion are provided. An instance is represented by K feature groups as $$x = [x^{(1)}, x^{(2)}, \ldots, x^{(K)}]^T \in \mathfrak{R}^D, x^{(K)} \in \mathfrak{R}^D$$

where $x^{(K)}$ is the k-th feature group with d features and the concatenated feature dimensionality D=Kd.

A squared Mahanalobis distance metric is $$d_{ij}^A = (x_i - x_j)^T A(x_i - x_j), \forall x_i, x_j \in \Re^D, A \geq 0 \quad (5)$$

where A is a Mahanalobis matrix.

$B \subseteq \Re^{D \times D}$ the block matrix space in which matrices consist of K×K blocks, each of size d×d.

$B_{kl}$ is the sparse block matrix space where only the block in the k-th row and the l-th column is non-zero.

$\lfloor A \rfloor_{kl}$ is the projection matrix A onto $B_{kl}$ $\|A\|_F$, tr(A) and r(A) are the Frobenius norm, trace norm and rank of A.

$\|A\|_{S0} = \text{card}\{k | \lfloor A \rfloor_{kl} \neq 0 \vee \lfloor A \rfloor_{lk} \neq 0 \exists 1\}$ is the number of feature groups used by A (i.e., the defined structural $l^0$ norm of A).

$\Pi_{PSD}(A)$ is the projection of A onto Positive Semi-Definite space; $\Pi_v(A)$ is the simplex projection to make its trace norm lower than v.

$x_i \sim x_j$ or $\pi_{ij} = +1$ denote $x_i$ and $x_j$ are of the same category; $x_i \not\sim x_k$ or $\pi_{ik} = -1$ denote they are of different categories.

$N = |\chi|$, $N_i^+ = |\{x_j | x_j \sim x_i, x_j \in \chi\}|$ and $N_i^- = |\{x_k | x_k \not\sim x_i, x_k \in \chi\}|$ are the total number of training samples, the number of same-category and the number of different category samples to $x_i$, respectively.

Consider the situation where instances are represented by a large collection of fixed-size feature groups without loss of generality to cases with varying-size feature groups. These feature groups could be subspaces of the original feature, or wavelet descriptors at different positions and scales, such as, e.g., scale-invariant feature transform (SIFT) and local binary pattern (LBP) features. Due to the huge redundancy in overcomplete representations, a desired metric should avoid using feature groups with little discriminability so as to estimate similarities between instances very efficiently without loss of accuracy. As such, the metric learning may be formulated as follows:

$$\min_A \quad f(A|\chi) = \frac{\lambda}{2}\|A\|_F^2 + l(A|\chi) \quad (1)$$

$$\text{subject to} \quad A \geq 0, \|A\|_{S0} \leq \mu, tr(A) \leq v$$

in which $l(A|\chi)$ is the empirical loss function regarding the discriminability of Mahanalobis matrix A upon training set $\chi$. The regularization term penalizes matrix A by its squared Frobenius norm with coefficient λ for better generalization ability; A≥0 is to keep the learned metric satisfying triangle inequality; tr(A)≤v is to obtain a low-rank matrix A so that every instance eventually can be represented in a low-dimensional space; and in particular, $\|A\|_{S0} \leq \mu$ is to impose group sparsity on matrix A to insure that only a limited number of feature groups (smaller than μ) will be actually involved.

However, the optimization task in Equation (1) is NP hard due to the structural $l^0$ norm and, thus, extremely difficult to solve with high dimensional overcomplete representations of data. Referring now to FIG. 1, a block/flow diagram showing a method for metric learning 100 is illustratively depicted in accordance with one embodiment. In block 102, sparse block diagonal metric ensembling is performed. Pseudocode 1 illustratively depicts sparse block diagonal metric ensembling in accordance with one embodiment.

---

Pseudocode 1: Sparse block diagonal metric ensembling.
Input: $\chi$, μ, and λ
A→0
for t = 1 to μ, do $$\kappa = \arg\max_{\kappa \in 1, 2, \ldots, K} \left\| \Pi_{PSD}\left( -\left[\frac{\partial f(A|\chi)}{\partial A}\right]_{\kappa \kappa} \right) \right\|_2$$

$$A_\kappa^*, \alpha^* = \arg\min_{A_\kappa \geq 0, A_\kappa \in B_{\kappa\kappa}, \alpha \in \Re^+} f(\alpha A + A_\kappa | \chi)$$

(A → α*A + A*_κ)
end for
$A_\dagger = A$, $L_\dagger = U$ where $U \Lambda U^T = A$, $U \in \Re^{D \times D\dagger}$
Output: $A_\dagger$ and $L_\dagger$

---

Starting with an empty feature group set (A=0), in block 104, effective feature groups are iteratively determined (indicated by κ). Effective feature groups refer to the group of features most like to reduce the loss objective value. Preferably, the criterion is the largest derivative norm of the loss object function. In each iteration, the k-th feature group is determined as the effective feature group (i.e., the feature group having the largest derivative norm). The opposite of partial derivative matrix is projected onto Positive Semi-Definite space so that it decreases the loss function while keeping the updated matrix Positive Semi-Definite. In block 106, weak metrics ($A_\kappa^*$) corresponding to the effective feature groups are learned as metrics with a smallest expected loss. Weak metrics refer to the metrics learned in each iteration. Every candidate feature group is evaluated by the partial derivative of loss function $f(\bullet)$ with respect to its corresponding diagonal block in matrix A. Preferably, corresponding weak metrics are learned by gradient descent.

In block 108, the corresponding weak metrics are combined into a strong metric to provide an intermediate Mahanalobis distance metric matrix, $A_\dagger$. The strong metric refers to the combination of all weak metrics learned in each iteration. Sparse block diagonal metric ensembling selects the diagonal block with the largest $l^2$ norm of projected partial derivative matrix and optimizes it with a scale factor α adjusting the previously learned matrix to minimize the loss function. After μ iterations of weak metric learning, an intermediate Mahanalobis distance metric, $A_\dagger$, is obtained with at most μ feature groups involved, whose orthogonal linear transformation matrix $L_\dagger$ preliminarily reduces feature dimensionality from D to $D_\dagger$ ($D_\dagger \ll D$).

In block 110, joint metric learning is then performed. The goal of joint metric learning is to learn a better Mahanalobis metric than determined in sparse block diagonal metric ensembling 102 using the corresponding features of the intermediate distance metric. Owning to the supervised dimension reduction achieved by sparse block diagonal metric ensembling in block 102, joint metric learning is capable of further exploiting correlations between selected feature groups in the intermediate feature space $\chi_\dagger$ without diagonal block constraints. The projected gradient descent method may be adopted to solve this optimization program. Pseudocode 2 illustratively depicts joint metric learning in accordance with one embodiment.

---

Pseudocode 2: Joint metric learning.
Input: $\chi$, v, λ, and $U_\dagger$
Dimension reduction: $\chi_\dagger = \{U_\dagger^T x | x \in \chi\}$
A→0

```
while do not converge do

∇f(A|χ₊) = ∂f(A|χ₊)/∂A choose a proper step γ by line search
    A → Π_v A-γ∇f(A|χ₊)
    end while
    L_‡ = L_† L where LL^T = A
    A_‡ = L_‡ L_‡^T
    Output: A_‡ and L_‡
```

In block 112, a loss function of all metric parameters corresponding to the selected effective feature groups is iteratively optimized by gradient descent with a proper step size. The term "all metric parameters" are used to distinguish those parameters in sparse block diagonal metric learning 102. In sparse block diagonal metric learning 102, only the parameters within each weak metric (i.e., each feature group) are tuned. In other words, the parameters across different feature groups are set to zero, thus the metric parameters form a block diagonal matrix. In joint metric learning 110, all metric parameters are tuned (i.e., they form a full matrix). In a preferred embodiment, the selected effective feature group includes the corresponding features of the intermediate metric. The proper step size is preferably determined by a line search method, however other methods are also contemplated. Gradient descent may include any method of gradient descent.

In block 114, the Mahanalobis matrix is regulated by projecting its eigenvalues onto a simplex for satisfying tr(A)≤v and A≥0 to learn a final metric matrix with low rank regularization. In this way, the joint metric learning method may learn a secondary linear transformation matrix L to map instances onto even lower dimensional space. The final linear transformation matrix $L_‡ = L_† L$ helps represent all instances in a $D_‡$-dimensional space, where Euclidean distance is the optimal metric for similarity measurement. In other words, $A_‡ = L_‡ L_‡^T$ is the final Mahanalobis matrix. Low rank regularization refers to the metric parameter matrix (i.e., using all metric parameters) should be a low rank matrix. To obtain a low rank matrix from a general full matrix, the present principles perform a projection (i.e., projecting eigenvalues onto a simplex). The simplex refers to N non-negative numbers whose sum is one. By projecting eigenvalues onto a simplex, many eigenvalues are forced to be zeros, thereby providing a low rank matrix by composing matrix eigenvectors and projected eigenvalues.

The computation of empirical loss function $l(A|\chi)$ and its gradient, which is defined by constraints between instances, may be important steps in this method 100. From training data with explicit class labels, two types of constraints can be generated: pairwise and triplet. For example, let $x_i$ and $x_j$ be two instances of the same category and $x_k$ be the instance of another category. From the view point of $x_i$, on one side, pairwise constraints are $d_{ij}^A < \theta$ and $d_{ik}^A > \theta$, where θ is a general threshold separating all similar pairs from dissimilar ones. Constraints of this type are adopted in verification problems that determine whether a pair of instances belong to the same category or not. On the other side, the triple constraint is $d_{ij}^A \le d_{ik}^A$, which is a ranking preference designed for clustering or retrieval tasks that are concerned with relative difference of distances between instances.

The empirical error of A with threshold θ on all pairwise constraints from χ is defined by:

$$\epsilon_\theta(A|\chi) = Pr(\pi_{ij}(d_{ij}^A - \theta) > 0 | x_i, x_j \in \chi) \quad (2)$$

$$= E_{x_i, x_j \in \chi} 1_{\pi_{ij}(d_{ij}^A - \theta) > 0}$$

in which $\pi_{ij} = \pm 1$ indicates whether $x_i$ and $x_j$ belong to the same category or not, and $1_{(\cdot)}$ is the characteristic function that outputs 1 is (•) is satisfied or 0 otherwise. By replacing $1_{(\cdot)}$ with the exponential-based logit surrogate function, $$\psi_\beta(e^z) = \frac{\ln(1 + \beta e^z)}{\ln(1 + \beta)},$$

and setting β=1, the upper bound of the empirical error is obtained as follows.

$$\epsilon_\theta(A|\chi) = E_{x_i, x_j \in \chi} \psi_1\left(e^{d_{ij}^A - \theta}\right) \quad (3)$$

$$= \frac{1}{N^2 \ln 2} \sum_{i,j} \ln\left(1 + e^{\pi_{ij}(d_{ij}^A - \theta)}\right)$$

$$= l_\theta(A|\chi)$$

which is smooth and convex, serving as the empirical loss function with pairwise constraints.

Let $\eta_{ij} = d_{ij}^A - \theta$. Applying the chain rule results in the following:

$$\frac{\partial l_\theta(A|\chi)}{\partial A} = \sum_{i,j} \frac{\partial l_\theta(A|\chi)}{\partial \eta_{ij}} \cdot \frac{\partial \eta_{ij}}{\partial A} \quad (4)$$

$$= \sum_{i,j} w_{ij} \cdot (x_i - x_j)(x_i - x_j)^T$$

in which the weight term is:

$$w_{ij} = \frac{\partial l_\theta(A|\chi)}{\partial A} \quad (5)$$

$$= \frac{\pi_{ij}}{N^2 \ln 2} \cdot \frac{e^{\pi_{ij}(d_{ij}^A - \theta)}}{1 + e^{\pi_{ij}(d_{ij}^A - \theta)}}$$

Given the weight matrix $W = \{w_{ij}\}_{N \times N}$ equation (4) can be efficiently computed by:

$$\frac{\partial l_\theta(A|\chi)}{\partial A} = X(S - W - W^T)X^T \quad (6)$$

where $X = [x_1, x_2, \ldots, x_N]$ is the feature matrix of χ and $$X = \text{diag}(\Sigma_k w_{1k} + w_{k1}, \ldots, \Sigma_k w_{Nk} + w_{kN}).$$

The empirical error of A on all triplet constraints from $\chi$ is defined as follows.

$$\epsilon(A|\chi) = Pr(d_{ij}^A > d_{ik}^A | x_j \sim x_i, x_k \nsim x_i) \quad (7)$$
$$= E_{xi,xj\sim xi, xk \nsim xi} 1_{d_{ij}^A > d_{ik}^A}$$

Similarly, the upper bound of this empirical error is as follows.

$$\epsilon(A|\chi) \le E_{xi,xj\sim xi, xk \nsim xi} \psi_\beta(e^{d_{ij}^A - d_{ik}^A}) = \bar{l}(A|\chi) \quad (8)$$

However, this is not an appropriate loss function as the computational complexity given $\{d_{ij}^A | \forall i, j\}$ could be $O(N^3)$. By using the concavity of $\psi_\beta(\bullet)$, it is further relaxed as follows.

$$\bar{l}(A|\chi) \le E_{xi}\psi_\beta(E_{xj\sim xi, xk\nsim xi} e^{d_{ij}^A - d_{ik}^A}) = E_{xi}\psi_\beta(E_{xj\sim xi}e^{d_{ij}^A} \cdot E_{xk\nsim xi} e^{-d_{ik}^A}) \quad (9)$$
$$= E_{xi}\psi_\beta(\varphi_i^+ \cdot \varphi_i^-)$$
$$= l(A|\chi)$$

where $$\phi_i^+ = E_{xj\sim xi} e^{d_{ij}^A} \quad (10)$$
$$= \frac{1}{N_i^+} \sum_{xj\sim xi} e^{d_{ij}^A}$$
$$\phi_i^- = E_{xk \nsim xi} e^{d_{ik}^A}$$
$$= \frac{1}{N_i^-} \sum_{xk\nsim xi} e^{d_{ik}^A}$$

Equation (9) is a loss function holding the upper bound of empirical error with all triplet constraints generated from $\chi$. It's computational complexity given $\{d_{ij}^A | \forall, j\}$ is just $O(N^2)$, the same as that with pairwise constraints in equation (3).

Similar to equations (4) and (5) for pairwise constraints, the loss function is reformulated as follows.

$$\frac{\partial l(A|\chi)}{\partial A} = \sum_{i,j} w_{ij} \cdot (x_i - x_j)(x_i - x_j)^T \quad (11)$$

where $$w_{ij} = \frac{\beta \phi_i^+ \exp(d_{ij}^A)}{NN_i^+ \ln(1+\beta) \cdot (1 + \beta \phi_i^+ \phi_i^-)} \text{ for } x_j \sim x_i,$$

and $$w_{ij} = -\frac{\beta \phi_i^- \exp(-d_{ij}^A)}{NN_i^- \ln(1+\beta) \cdot (1 + \beta \phi_i^+ \phi_i^-)} \text{ for } x_j \nsim x_i.$$

Advantageously, the metric learning method 100 is able to learn a sparse combination of features from an overcomplete feature set to achieve very low-dimensional representation of every instance to facilitate, e.g., image verification and retrieval tasks. The method 100 preserves good discriminability to distinguish objects of different categories with little computational resources, which may be important in processing large data sets.

Figure 2:
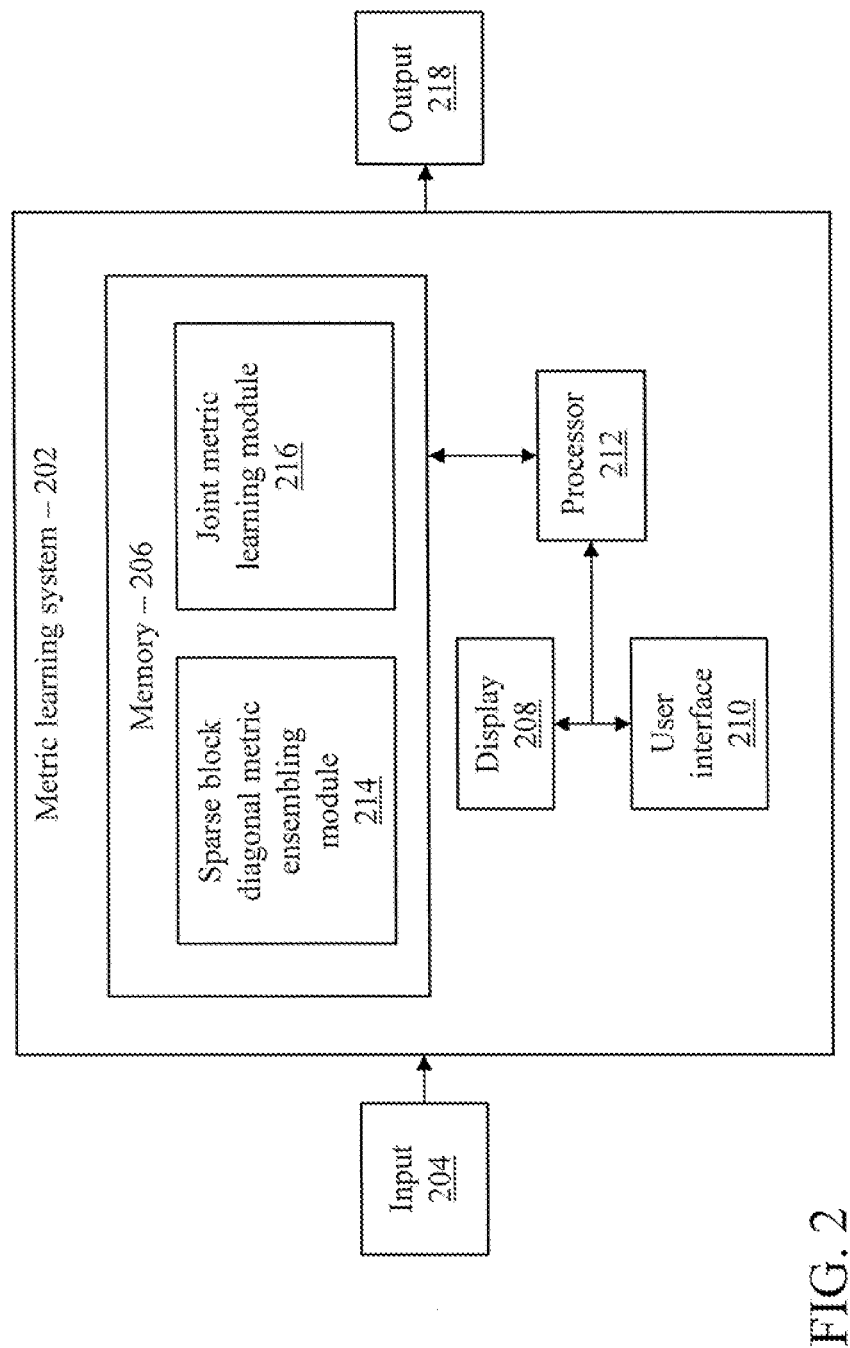
FIG. 2 is a block/flow diagram showing a system for metric learning in accordance with one embodiment.

Referring now to FIG. 2, a block/flow diagram showing a system for metric learning 200 is illustratively depicted in accordance with one embodiment. The metric learning system 202 preferably includes one or more processors 212 and memory 206 for storing programs and applications. It should be understood that the functions and components of system 202 may be integrated into one or more systems.

The system 202 may include a display 208 for viewing. The display 208 may also permit a user to interact with the system 202 and its components and functions. This is further facilitated by a user interface 210, which may include a keyboard, mouse, joystick, or any other peripheral or control to permit user interaction with the system 202.

The system 202 may receive an input 204, such as, e.g., input images and an image database. The input images preferably include training images. Memory 206 may include sparse block diagonal metric ensembling module 214. Metric ensembling module 214 sequentially selects a set of features to constitute a sparse representation of an image from an overcomplete feature set. Metric ensembling module 214 starts from an empty feature group set, progressively chooses effective feature groups, learns weak metrics that correspond to diagonal blocks of a Mahanalobis matrix in the entire feature space, and combines the weak metrics into a strong metric to provide an intermediate Mahanalobis distance metric. Metric ensembling module 214 figures out an optimal combination of simple features to pursue low cost in coding every image (e.g., input image and images of the image database).

Memory 206 may also include joint metric learning module 216 configured to further reduce linear dimensionality to maximize discriminability between images of different people while minimizing the distance between images of the same person. In this way, each face image can be represented by a low-dimensional vector and, e.g., a Euclidean distance measures the dissimilarity between them. The joint metric learning module 216 learns another Mahanalobis matrix in the feature subspace enabled by the metric ensembling module 214 by jointly considering already selected features with an optional low-rank constraint to pursue a final representation of instances in an even lower space. The joint metric learning module 216 iteratively optimizes a loss function of all metric parameters corresponding to features of the intermediate metric matrix and regulates it by projecting it eigenvalues onto a simplex to provide a final metric matrix with low rank regularization. The output 218 of the metric learning system 202 may include the final metric matrix.

Having described preferred embodiments of a system and method for large-scale strongly supervised ensemble metric learning (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for metric learning, comprising:
   iteratively determining feature groups of images based on its derivative norm;
   learning corresponding metrics of the feature groups by gradient descent based on an expected loss;
   combining the corresponding metrics to provide an intermediate metric matrix as a sparse representation of the images;

determining $$\kappa = \underset{\kappa \in 1,2,\ldots,K}{\mathrm{argmax}} \left\| \prod_{PSD} \left( -\left\lfloor \frac{\partial f(A\mid \chi)}{\partial A} \right\rfloor_{KK} \right) \right\|_2 A_\kappa^*,$$

$$\alpha^* = \underset{A_K \geq 0, A_K \in B_{KK}, \alpha \in \mathcal{R}^+}{\mathrm{argmin}} f(\alpha A + A_K \mid \chi) A \to \alpha^* A + A_K^*$$

where K feature groups comprise $$x = [x^{(1)}, x^{(2)}, \ldots, x^{(K)}]^T \in \mathfrak{R}^D, x^{(K)} \in \mathfrak{R}^D$$

and where $x^{(K)}$ is the k-th feature group with d features and the concatenated feature dimensionality D=Kd with Mahanalobis matrix A, training set $\chi$, weak metrics $A_\kappa^*$ corresponding to effective feature groups;
   optimizing, using a processor, a loss function of all metric parameters corresponding to features of the intermediate metric matrix to learn a final metric matrix; and
   projecting eigenvalues of the final metric matrix onto a simplex.

2. The method as recited in claim 1, wherein iteratively determining feature groups of images includes projecting an opposite of partial derivative matrix onto positive semi-definite space.

3. The method as recited in claim 1, wherein iteratively determining feature groups of images includes evaluating each feature group by a partial derivative of loss function.

4. The method as recited in claim 1, wherein optimizing the loss function includes optimizing the loss function of all metric parameters corresponding to features of the intermediate metric matrix by gradient descent.

5. The method as recited in claim 4, wherein optimizing the loss function includes determining a step size by line search.

6. A system for metric learning, comprising:
   a sparse block diagonal metric ensembling module configured to iteratively determine feature groups of images based on its derivative norm, learn corresponding metrics of the feature groups by gradient descent based on an expected loss, and combine the corresponding metrics to provide an intermediate metric matrix as a sparse representation of the images using:

$$\kappa = \underset{\kappa \in 1,2,\ldots,K}{\mathrm{argmax}} \left\| \prod_{PSD} \left( -\left\lfloor \frac{\partial f(A\mid \chi)}{\partial A} \right\rfloor_{KK} \right) \right\|_2 A_\kappa^*,$$

$$\alpha^* = \underset{A_K \geq 0, A_K \in B_{KK}, \alpha \in \mathcal{R}^+}{\mathrm{argmin}} f(\alpha A + A_K \mid \chi) A \to \alpha^* A + A_K^*$$

where K feature groups include $$x = [x^{(1)}, x^{(2)}, \ldots, x^{(K)}]^T \in \mathfrak{R}^D, x^{(K)} \in \mathfrak{R}^D$$

and where $x^{(K)}$ is the k-th feature group with d features and the concatenated feature dimensionality D=Kd with Mahanalobis matrix A, training set $\chi$, weak metrics $A_\kappa^*$ corresponding to effective feature groups; and
   a joint metric learning module configured to optimize, using a processor, a loss function of all metric parameters corresponding to features of the intermediate metric matrix to learn a final metric matrix, and project eigenvalues of the final metric matrix onto a simplex.

7. The system as recited in claim 6, wherein the sparse block diagonal metric ensembling module is further configured to project an opposite of partial derivative matrix onto positive semi-definite space.

8. The system as recited in claim 6, wherein the sparse block diagonal metric ensembling module is further configured to evaluate each feature group by a partial derivative of loss function.

9. The system as recited in claim 6, wherein the joint metric learning module is further configured to optimize the loss function of all metric parameters corresponding to features of the intermediate metric matrix by gradient descent.

10. The system as recited in claim 9, wherein the joint metric learning module is further configured to determine a step size by line search.

\* \* \* \* \*